United States Patent Office 3,657,251
Patented Apr. 18, 1972

3,657,251
AMINE OXIDE PREPARATION
Richard D. Smetana, Beacon, N.Y., assignor to
Texaco Inc., New York, N.Y.
No Drawing. Filed Mar. 18, 1969, Ser. No. 808,350
Int. Cl. C07d 31/24
U.S. Cl. 260—290 P
7 Claims

ABSTRACT OF THE DISCLOSURE

Method of preparing tertiary amine oxide of the formula:

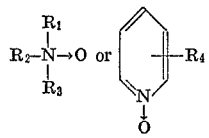

comprising contacting a tertiary amine of the formula:

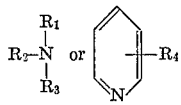

with an ozone derivative of the formula:

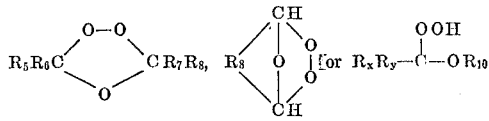

in the presence of a molybdenum, tungsten or vanadium oxide-forming catalyst where $R_1$, $R_2$, $R_3$ are alkyl, aryl, alkylaryl and arylalkyl, $R_4$ is hydrogen or alkyl; $R_5$, $R_6$, $R_7$, $R_8$, $R_x$, $R_y$ are hydrogen, alkyl, aryl, alkylaryl and arylalkyl, $R_9$ is $\alpha$, $\Omega$ alkylene and $R_{10}$ is alkyl or acyl.

BACKGROUND OF INVENTION

The amine oxides contemplated herein find uses as light duty liquid detergents, pour point depressants and polymerization inhibitors. In the past, they were prepared by contacting tertiary alkylamines such as trialkylamine and alkylated pyridines with peroxy compounds such as hydrogen peroxide, peracetic acid, perbenzoic acid and monoperphthalic acid. Although these past reactions do produce the amine oxide, they were not entirely satisfactory in respect to selectivity and yield.

SUMMARY OF INVENTION

I have discovered and this constitutes my invention a method which is more selective in producing amine oxides of the formula:

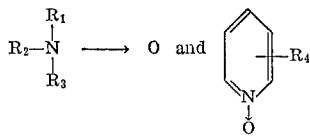

than many of the prior art methods. Further, it produces oxides in improved yields. Specifically, the method of the invention comprises contacting a tertiary amine of the formula:

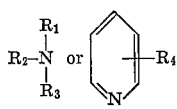

with an ozone derivative selected from the group consisting of the formula:

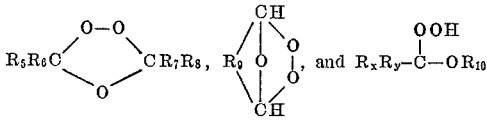

in the presence of a molybdenum, tungsten or vanadium oxide-forming catalyst where $R_1$, $R_2$, $R_3$ are alkyl, aryl, alkylaryl and arylalkyl of from 1 to 30 carbons; $R_4$ is hydrogen or alkyl of from 1 to 20 carbons; $R_5$, $R_6$, $R_7$, $R_8$, $R_x$, $R_y$ are hydrogen, alkyl, aryl, alkylaryl and arylalkyl of from 1 to 30 carbons; $R_9$ is alpha, omega ($\alpha$, $\Omega$)-alkylene of from 3 to 40 carbons and $R_{10}$ is alkyl of from 1 to 30 carbons or

where $R_{11}$ is alkyl of from 1 to 29 carbons.

DETAILED DESCRIPTION OF THE INVENTION

Most specifically, my invention comprises contacting a tertiary amine and an ozone derivative in the presence of molybdenum, tungsten or vanadium catalyst, all as heretofore defined, at a temperature between about −50 and 100° C. utilizing a mole ratio of tertiary amine to ozone derivative of between about 10:1 and 1:1 and a mole ratio of ozone derivative to catalyst of between about 1:1 and 1000:1. The reaction period normally ranges between about 1 to 40 hours.

Under preferred conditions, the reaction is conducted under conditions of agitation to facilitate contact of reactants and catalyst and further in the presence of an inert solvent constituting between about 50 and 95 wt. percent of the reaction mixture. Specific examples of such solvent are the liquid alkanes, halogenated liquid alkanes and dialkyl ethers such as pentane, methylene dichloride, chloroform and diethyl ether.

The oxide product can be isolated by standard means such as fractional distillation, filtration, extraction and combinations thereof.

Examples of the tertiary amine reactants are those where the $R_1$, $R_2$, and $R_3$ groups are phenyl, benzyl, tolyl and alkyl of from 1 to 14 carbons and $R_4$ is hydrogen or butyl, e.g., are pyridine, 4-butylpyridine, triethylamine, dimethyl-n-$C_{10}$–$C_{14}$-alkylamine, dimethylphenylamine, diethylbenzylamine, and p-tolyldimethylamine.

Their corresponding oxide products are triethylamine oxide, N-pyridine oxide, 4 - butylpyridine oxide, dimethyl-n-$C_{10}$–$C_{14}$ - alkylamine oxide, dimethylphenylamine oxide, diethylbenzyl amine oxide and p-tolyldimethylamine oxide.

Specific examples of the ozone derivatives within the scope of my invention are those where $R_5$, $R_6$, $R_7$ and $R_8$ are hydrogen, phenyl and alkyl from 1 to 6 carbons, $R_x$ and $R_y$ are hydrogen, phenylmethyl or hexyl, $R_9$ is $\alpha$, $\Omega$ alkylene of 4 carbons, $R^{10}$ is methyl or

where $R_{11}$ is methyl, e.g., 3-hexyl-1,2,4-trioxolane; 3-methyl-3-propyl - 1,2,4-trioxolane; 3 - methyl-3-phenyl-1,2,4-trioxolane; 7,8,9-trioxabicyclo[4.2.1]nonane; 1-methoxymethyl hydroperoxide; 1 - methoxy 1 - phenylethyl hydroperoxide; 1-methoxyheptyl hydroperoxide; 1-acetoxymethyl hydroperoxide and 1-acetoxy-1-phenylethyl hydroperoxide.

Suitable catalysts employed herein are molybdenum hexacarbonyl, molybdenum trioxide, molybdenum dioxide, sodium molybdate, molybdenum oxyacetylacetonate, sodium phospho-12-molybdate, vanadium pentoxide, sodium phospho-18-molybdate, phosphomolybdic acid, molybdenum sulfide, silicomolybdic acid, molybdenum pentachloride, ethylphosphomolybdate, and the corresponding tungsten and vanadium compounds such as sodium tungstate and sodium vanadate.

The following examples further illustrate the method of the invention but are not to be construed as limitations thereof.

EXAMPLE I

This example illustrates the preparation of triethylamine oxide from triethylamine.

To a 3-neck 100 ml. round bottomed Pyrex flask fitted with a condenser, calcium chloride drying tube, dropping funnel and magnetic stirrer, there was charged 5.5 grams (0.05 mole) triethylamine, 0.26 gram (0.001 mole) molybdenum hexacarbonyl and 20 grams of pentane. The temperature was adjusted to and maintained at 35° C. and stirring was initiated. From the dropping funnel there was slowly added 5.2 grams (16.2 millimoles) of a mixture of 1-methoxymethyl hydroperoxide and 1-methoxy-1-phenylethyl hydroperoxide. At the end of 3 hours a product was isolated by vacuum distillation. The isolated product was analyzed via infrared spectral analysis and it was determined to contain triethylamine oxide in an estimated yield of 50 wt. percent based on hydroperoxide.

EXAMPLE II

This example illustrates the preparation of N-pyridine oxide from pyridine.

The overall procedure of Example I was essentially employed. The ingredients utilized were 0.05 mole pyridine, 0.001 molybdenum hexacarbonyl, 20 grams pentane and 16.2 millimoles of a mixture of 1-methoxymethyl hydroperoxide and 1-methoxy-1-phenylethyl hydroperoxide. The reaction time was about 40 hours.

The extract residue was analyzed by infrared spectral analysis and determined to be N-pyridine oxide in a yield of about 80 wt. percent basis hydroperoxide.

EXAMPLE III

This example illustrates the preparation of dimethyl-n-$C_{10}$–$C_{14}$-alkylamine oxide from dimethyl-n-$C_{10}$–$C_{14}$-alkylamine.

The overall procedure of Example I was employed. The ingredients utilized were 0.05 mole of dimethyl-n-$C_{10}$–$C_{14}$-alkylamine, 0.001 mole molybdenum hexacarbonyl, 20 grams of pentane and 16.2 millimoles of a mixture of 1-methoxymethyl hydroperoxide and 1-methoxy-1-phenylethyl hydroperoxide. The reaction time was 3 hours.

The extract residue was analyzed and determined to be dimethyl-n-$C_{10}$–$C_{14}$-alkylamine oxide in a yield of 30 wt. percent basis hydroperoxide.

EXAMPLE IV

This example further illustrates the preparation of triethylamine oxide from triethylamine.

The overall procedure of Example I was utilized. The ingredients employed were 0.05 mole triethylamine, 0.001 mole molybdenum hexacarbonyl, 20 grams pentane, and 4.2 millimoles of 3-methyl-5-ethyl-1,2,4-trioxolane. The reaction time was 1 hour.

The extract residue was analyzed and determined to be triethylamine oxide in a yield of approximately 50 wt. percent basis the oxolane.

EXAMPLE V

This example further illustrates the preparation of N-pyridine oxide from pyridine.

The procedure of Example I was essentially repeated. The ingredients employed were 0.05 mole pyridine, 0.001 molybdenum hexacarbonyl, 20 grams pentane, and 4.2 millimoles of 3-ethyl-5-methyl-1,2,4-trioxolane.

Infrared spectral analysis of the extract residue determined the product to be N-pyridine oxide in a yield of 80 wt. percent basis the oxolane.

I claim:

1. A method of preparing an amine oxide of the formula

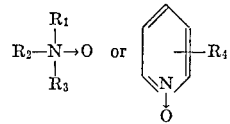

comprising contacting a tertiary amine of the formula:

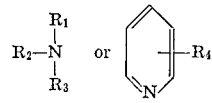

with an ozone derivative of the formula:

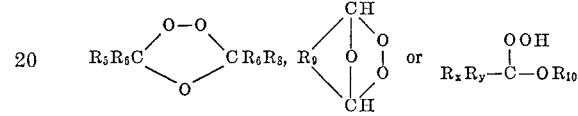

in the presence of a catalyst at a temperature between about −50 and 100° C. utilizing a mole ratio of tertiary amine to ozone derivative of between about 10:1 and 1:1 and a mole ratio of ozone derivative to catalyst of between about 1:1 and 1000:1, said $R_1$, $R_2$, $R_3$ being selected from the group consisting of phenyl, benzyl, tolyl, and alkyl of from 1 to 14 carbons, $R_4$ being hydrogen or butyl, $R_5$, $R_6$, $R_7$, $R_8$ are selected from the group consisting of hydrogen, phenyl, and alkyl of from 1 to 6 carbons, $R_x$ and $R_y$ are hydrogen, phenylmethyl or hexyl, $R_9$ is α, Ω alkylene of 4 carbons and $R_{10}$ is methyl or

where $R_{11}$ is methyl, said catalyst selected from the group consisting of molybdenum trioxide, molybdenum dioxide, sodium molybdate, molybdenum oxyacetylacetonate, molybdenum sodium phospho-12-molybdate, vanadium pentoxide, sodium phospho-18-molybdate, phosphomolybdic acid, molybdenum sulfide, silicomolybdic acid, molybdenum pentachloride, ethylphosphomolybdate, sodium tungstate and sodium vanadate.

2. A method in accordance with claim 1 wherein said oxide is pyridine oxide, said tertiary amine is pyridine, said ozone derivative is 3-methyl-5-ethyl-1,2,4-trioxolane and said catalyst is molybdenum hexacarbonyl.

3. A method in accordance with claim 1 wherein said oxide is triethylamine oxide, said tertiary amine is triethylamine, said ozone derivative is 3-methyl-5-ethyl-1,2,4-trioxolane and said catalyst is molybdenum hexacarbonyl.

4. A method in accordance with claim 1 wherein said ozone derivative is a mixture of 1-methoxymethyl hydroperoxide and 1-methyl-1-phenylethyl hydroperoxide and said catalyst is molybdenum hexacarbonyl.

5. A method in accordance with claim 4 wherein said oxide is triethylamine oxide and said amine is triethylamine.

6. A method in accordance with claim 4 wherein said oxide is dimethyl n-$C_{10}$–$C_{14}$-alkylamine oxide and said amine is dimethyl-n-$C_{10}$–$C_{14}$-alkylamine.

7. A method in accordance with claim 4 wherein said oxide is N-pyridine oxide and said amine is pyridine.

References Cited

UNITED STATES PATENTS 3,520,888  7/1970  Johnston et al. _____ 260—290

HENRY R. JILES, Primary Examiner

H. I. MOATZ, Assistant Examiner

U.S. Cl. X.R.

260—570.9, 577, 578, 583 D

UNITED STATES PATENT OFFICE
CERTIFICATE OF CORRECTION

Patent No. 3,657,251            Dated April 18, 1972

Inventor(s) RICHARD D. SMETANA

It is certified that error appears in the above-identified patent and that said Letters Patent are hereby corrected as shown below:

Col. 1, lines 27-33    change the formula

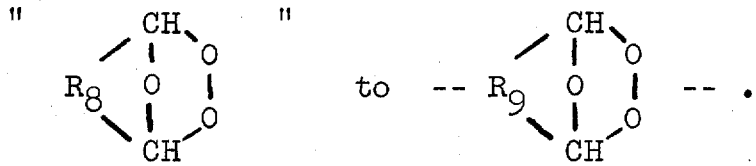

Col. 2, line 57,    change "$R^{10}$" to --$R_{10}$--.

Col. 4, lines 17-21,    change the formula

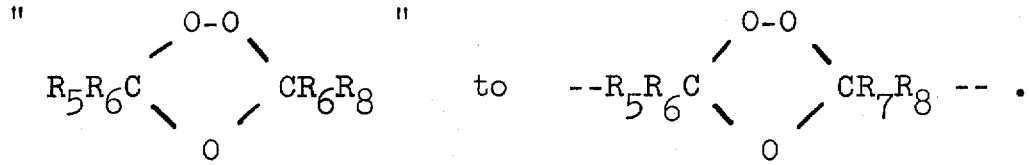

Signed and sealed this 26th day of December 1972.

(SEAL)
Attest:

EDWARD M. FLETCHER, JR.
Attesting Officer

ROBERT GOTTSCHALK
Commissioner of Patents